United States Patent [19]

Potter et al.

[11] 3,995,003

[45] *Nov. 30, 1976

[54] PROCESS FOR MAKING A PARTICLE BOARD

[75] Inventors: Edward Potter; Irving W. Potter, both of Beaverton; Robert M. Smyth, Lake Oswego, all of Oreg.

[73] Assignees: Edward Potter, Beaverton; Dant & Russell, Inc., Portland, both of Oreg. ; part interest to each

[ * ] Notice: The portion of the term of this patent subsequent to Apr. 16, 1991, has been disclaimed.

[22] Filed: Jan. 14, 1974

[21] Appl. No.: 433,272

Related U.S. Application Data

[63] Continuation-in-part of Ser. No. 297,999, Oct. 16, 1972, Pat. No. 3,804,935.

[52] U.S. Cl. ................................ 264/122; 264/271

[51] Int. Cl.[2] ........................................ B29J 5/00

[58] Field of Search ............ 264/109, 122, 118, 271

[56] References Cited

UNITED STATES PATENTS

| | | | |
|---|---|---|---|
| 2,923,030 | 2/1960 | Himmelheber et al. | 264/118 |
| 3,309,444 | 3/1967 | Schueler | 264/122 |
| 3,517,805 | 6/1970 | Gould | 264/122 |
| 3,804,935 | 4/1974 | Potter et al. | 264/122 |

FOREIGN PATENTS OR APPLICATIONS

| | | |
|---|---|---|
| 128,169 | 4/1946 | Australia |
| 84,714 | 2/1965 | France |
| 1,207,054 | 8/1959 | France |
| 1,281,431 | 12/1961 | France |
| 1,205,695 | 11/1965 | Germany |

*Primary Examiner*—Robert F. White
*Assistant Examiner*—J. R. Hall
*Attorney, Agent, or Firm*—Chernoff & Vilhauer

[57] ABSTRACT

A process for making a particle board of substantial continuous thickness utilizing any of a wide assortment of comminuted lignocellulosic materials. The particle board is prepared by mixing dried lignocellulosic particles with one or more thermosetting or thermoplastic adhesive binders in predetermined proportions, and placing a measured amount of the resultant mixture in an elongate mold where it is bonded together under the influence of pressure and heat. The mold includes a movable pressure plate forming the top of an enclosure within which the material is compressed to a predetermined thickness by pressure applied to the exterior of the plate. The thickness of the compressed mixture is substantial, so as to enable the production of particle board pieces having sufficient continuous solid thickness that they may be used for such applications as dimension lumber or railroad ties, or may be sawed into multiple thinner pieces for other applications such as siding. After the mixture in the mold has been compressed to the predetermined thickness, fasteners are attached for retaining the pressure plate in its compressed position. Thereafter the mold is taken from the press and transferred to an oven where its contents, still under pressure from the retained pressure plate, are baked or cured for an extended period of time and then allowed to cool, after which the pressure plate is removed from the mold permitting the removal of the resultant bonded particle board product.

14 Claims, 4 Drawing Figures

PROCESS FOR MAKING A PARTICLE BOARD

Cross-reference to Other Application

This application is a continuation-in-part of our co-pending application, Ser. No. 297,999, filed Oct. 16, 1972 now U.S. Pat. No. 3,804,935. A further related application is our application, Ser. No. 572,112, filed Apr. 28, 1975, which is a continuation of application Ser. No. 359,687, filed May 14, 1973, now abandoned, which was in turn a division of said application Ser. No. 297,999.

Background of the Invention

This invention relates to a unique process by which a particle board of substantial continuous solid thickness can be manufactured from any of a wide variety of comminuted lignocellulosic materials at a high, economical production rate despite the substantial thickness of the resultant product.

The lumber industry is presently concerned with the severe problem of disposing of vast amounts of bark and other wood wastes accumulating at sawmills in the lumber-producing regions of the world. Although limited amounts of the wastes may be used in paper production or as fuel, there remain huge quantities of bark, sawdust and shavings for which no adequate market presently exists. In the past disposal of such waste material by burning caused sufficient air pollution that the practice has now been prohibited in many areas. More recent types of disposal result in land pollution or land disfiguration, which is equally undesirable. Industries generating other types of lignocellulosic waste materials, such as bagasse from sugar cane processing, or straw, corn stalks, rice hulls, etc. are faced with a similar disposal problem.

A somewhat different but related disposal problem is faced by the railroads which every year are forced to remove and replace vast numbers of railroad ties which, because of decay, have become too weak for further useful service. Not only is the cost of manufacturing new railroad ties substantial, but there is no satisfactory way to dispose of the old creosoted wood ties without causing air or land pollution.

In the past a number of processes for manufacturing resin-bonded particle board products from various lignocellulosic waste materials have been developed in a an attempt to create a demand for sawmill wood wastes and certain other vegetable wastes. Several of these processes are exemplified in Elmendorf et al. U.S. Pat. No. 2,381,269 issued Aug. 7, 1945, Roman U.S. Pat. No. 2,446,304 issued Aug. 3, 1948, goss U.S. Pat. No. 2,581,652 issued Jan. 8, 1952 and Schueler U.S. Pat. No. 3,309,444 issued Mar. 14, 1967. A significant characteristic of most of the previous particle board manufacturing processes is that they form the particle board by the simultaneous application of heat and pressure to the material mixture in a relatively expensive hot platen press. This occupies the press and thus delays production for a period of time necessary to insure sufficient curing of any thermosetting binder used, or sufficient plasticizing of any thermoplastic binder used, the duration of such time period being a function primarily of the thickness of the compressed mixture. The temperature of the press cannot usually be raised significantly to shorten the period of time because unacceptable charring or scorching of the material may then result.

The aforementioned time delay raises a serious problem, because platen presses are such expensive items that they must be maintained at high rate of production continuously in order to enable particle board to be manufactured economically. This requirement has, up to now, forced the particle board industry to limit severely the maximum final thickness of the product to between about 178 and ¾ inch. Such limited thickness requires only a fraction of an hour for curing or baking in a platen press under normal temperature conditions as opposed, for example, to at least 2 hours for material of 1½ inch thickness. The present maximum economically practical board thickness of between about 178 and ¾ of an inch, caused by the shortcomings of present production methods, has unfortunately foreclosed particle board from entering certain very substantial markets where the demand for particle board would certainly multiply many times and would thus help to relieve lumber shortages while contributing to the solution of sawmill wood waste and other lignocellulose waste disposal problems.

Despite the fact that the aforementioned problem of platen press inefficiency and the resultant economic limitation on the thickness of particle board has been clearly recognized by the industry for many years, no adequate measures have been devised for alleviating the problem. Goss, who recognized the problem 25 years ago as evidenced by the disclosure of his above-mentioned patent, attempted to alleviate the delay caused by the use of the heated platen press by removing the particle board mix prematurely from the platen press and finishing the curing process without the application of any pressure whatsoever. Such practice however does not yield as strong a bonded wood product as is obtainable with the simultaneous application of heat and compression. Accordingly there is presently no satisfactory production process available by which particle board of substantial continuous thickness, say one inch or greater, can be economically manufactured from lignocellulosic waste materials. Consequently particle board cannot readily be sold into such substantial markets as those for dimension lumber (e.g. studs, decking, framing lumber, etc.) or railroad ties, all of which require pieces of substantial continuous thickness, without requiring lamination of thin particle board pieces to produce a thick piece which is undesirable both from economic and structural standpoints. Moreover, due to the thickness limitation, particle board cannot economically be produced in pieces thick enough to be used as raw "logs" for sawing into lumber products of thinner dimension such as siding, grape stakes, etc.

Accordingly a great need presently exits for an efficient and economical particle board manufacturing process which utilizes a maximum amount of lignocellulosic waste matter and produces particle board pieces having sufficient continuous thickness and other characteristics to enable such product to be sold competitively into the above-described additional markets from which particle board is presently foreclosed, thereby establishing a requirement for a much greater percentage of lignocellulosic wastes than is presently being utilized and serving as a substitute for lumber in the marketplace so as to help alleviate lumber shortages.

SUMMARY OF THE INVENTION

The present invention is directed to a method for economically making a particle board of substantial thickness and density which eliminates the economic problem of limited thickness of the finished product, presently caused by efficiency limitations of the heated platen press, by eliminating completely the requirement for a platen press while retaining its advantages. The product may be manufactured utilizing virtually any tupe of comminuted lignocellulose material, including but not limited to such types as hardwoods or softwoods, particularly in the form of chips, shavings and sawdust, their barks, bargasse, straw, rice hulls, corn stalks, reeds, vegetable stems, cork and the like, or mixtures thereof. Such versatility with respect to the raw materials utilized is particularly applicable if the resultant product has no particular strength requirement, such as where the product is to be cut for siding, or where the resultant product has not tensile or bending strength requirement but rather only a compressive strength requirement. A requirement for a predetermined tensile or bending strength may dictate the use only of the more woody or fibrous lignocellulose materials. The process by which a highly densified, substantially thicker particle board product is economically produced comprises utilizing a plurality of special molds for holding the lignocellulose material, adhesive binders and other mixed ingredients from which the product is manufactured. Each mold includes a wholly insertable lockable pressure plate which, in combination with the mold, forms an enclosure surrounding the material. The process of the present invention comprises placing the mold in a cold press and applying pressure to the plate so as to substantially densify the mixture and compress the mixture to a predetermined substantial thickness and to a shape conforming with the interior of the mold. While the mold is under such initial compression, fasteners are applied to the mold which function to lock and retain the pressure plate in its compressed position regardless of whether or not the mold thereafter remains in the press. Consequently it is possible to transfer the locked mold as an assembly immediately from the press with no expansion or loss of internal pressure of the mixture, although the initial external pressure imposed by the press has been released. The material may then be bonded together by hardening the adhesive binder within the locked mold by curing, or by heating and subsequent cooling, depending upon the type or types of adhesive binders utilized, for the required period of time during which the internal pressure of the material gradually decreases. After hardening the binder or binders has been completed, the material is then removed by unlocking the pressure plate and dismantling the mold. The molds are built in such predetermined dimensions that the final molded particle board piece may thereafter be applied to its intended use without further processing or, alternatively, the molded piece may thereafter be sawed conveniently into smaller pieces of a size suitable for a particular intended use with only negligible waste of the product because the mold dimensions are preferably such as to provide enough excess only for sawing and sanding.

The steps, after initial momentary compression of the mixture, of locking the pressure plate in a compressed position and removing the mold and locked pressure plate assembly from the press with the compression still retained, permits the material thereafter to be heated in an oven for an extended period of time, to cure and/or plasticize the binder as the case may be, without thereby tying up an expensive platen press. Meanwhile the press, by far the most expensive single piece of equipment utilized in the process, is free to compress additional quantities of the material which may then immediately be added to the oven while the initial mixture is being heated. Since large ovens of the type contemplated for accepting multiple molds have a much lower acquisition cost than do a series of platen presses having the same total capacity, the economic disadvantages occasioned previously by the long heating times in palten presses required for thick particle boards is eliminated.

The ability of the foregoing particle board molding process economically to produce much thicker, and yet highly densified, particle board pieces makes possible the development of techniques for gainfully utilizing lignocellulosic waste materials for new products and new markets not heretofore considered feasible. In our copending U.S. application Ser. No. 297,999, filed Oct. 16, 1972, now U.S. Pat. No. 3,804,935 the use by means of the foregoing molding process of wood wastes, certain barks, bagasse, etc. in the manufacture of thick particle board pieces adapted to be cut into dimension lumber (for example, 2 × 4 studs) is disclosed. The same basic molding process can additonally be used to manufacture a wide variety of other products such as roof decking, grape stakes, decorative or protective siding, beams, columns, etc. It is significant that the inclusion of a substantial portion of bark, approximately 30% or more by weight, in the materials mixture provides a significantly higher degree of fire retardation in the resultant product than if solely wood sawdust, shavings and/or chips are used in the product. This can be very advantageous since fire retardation characteristics of any building material are usually critical.

One other extremely valuable application for the molding process is in the recycling of used railroad ties. By comminuting the wood from old rotted ties, mixing it with thermosetting and/or thermoplastic binders and then molding it by the above-described process into thick pieces having the dimensions required for ties, new ties can be readily produced from the old, thereby saving lumber and obviating the disposal of old ties. Since the old materials are already creosoted, there is an additional benefit in that no creosoting of the new ties need be performed. Of course new ties could alternatively be produced utilizing other lignocellulose wastes by the same molding method if desired.

It is therefore a principal objective of the present invention to provide a process by which highly densified particle board pieces of substantial continuous thickness can be produced economically by the application of pressure during the hardening of the adhesive binder without requiring the use of a heated platen press.

The foregoing and other objectives, features and advantages of the present invention will be more readily understood upon consideration of the following detailed description of the invention taken in conjunction with the accompanying drawings.

DETAILED DESCRIPTION OF THE INVENTION

Figure 1:
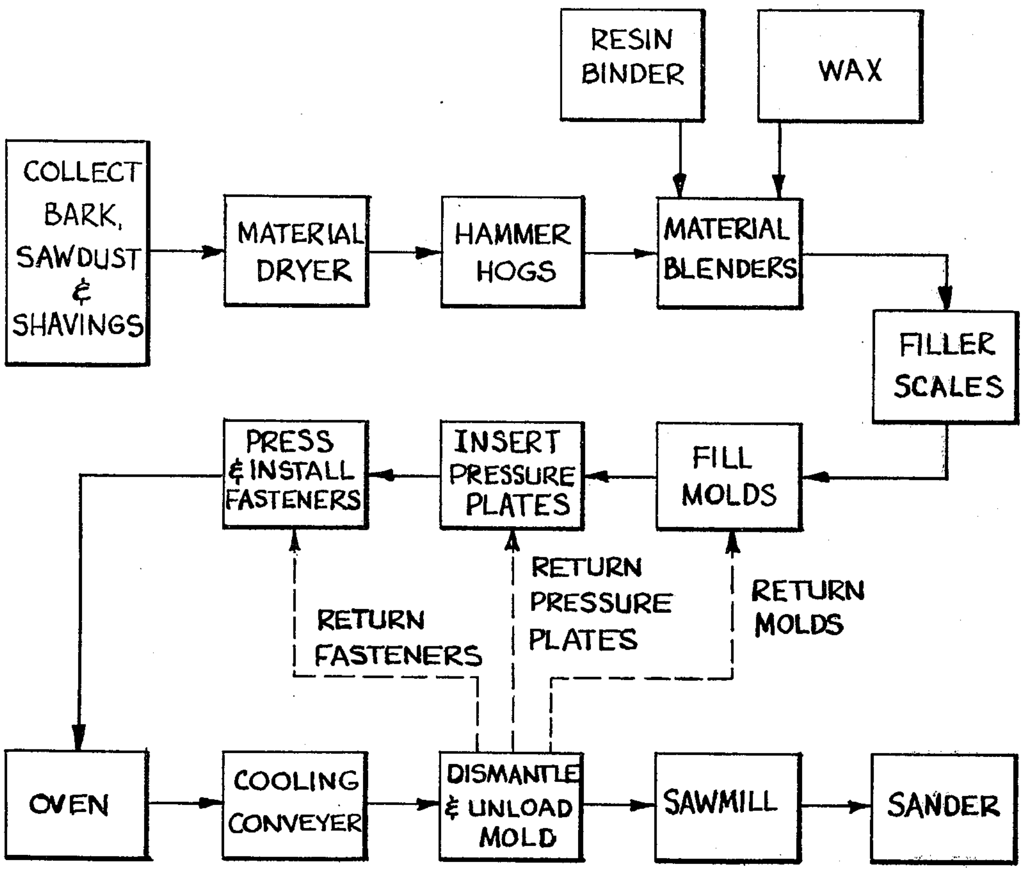
FIG. 1 is a schematic flow diagram of an exemplary production process which may be utilized to manufacture a particle board product in accordance with the present invention.

FIG. 1 illustrates schematically the various steps which may be utilized in manufacturing a particle board product from lignocellulose materials in accordance with the process of the present invention. Although in FIG. 1 the lignocellulose waste materials are indicated as being bark, sawdust and shavings of the type which may be collected from sawmills, it should be understood that the process can utilize virtually any lignocellulosic matter as raw input material, including but not limited to all soft woods and hard woods, particularly in the form of sawdust, shavings and chips, their barks and other lignocellulose materials such as bagasse, straw, rice hulls, corn stalks, reeds, vegetable stems, cork, etc. Moreover, each type of lignocellulose material may be used alone or in mixture with one or more other types of lignocellulose material. Where tensile or bending strength of the resultant product is important to its application, such as with framing or dimension lumber, it may be desirable to utilize substantial amounts of only the more woody or fibrous types of lignocellulose materials which are best adapted to provide the required tensile strength, such as for example wood, redwood or cedar bark, bagasse, etc. The process described herein is by no means limited to any particular group of lignocellulose materials, however, since all are considered to be potentially useful in the manufacture of products where no substantial strength requirements need be met such as decorative or protective siding or wall covering.

The lignocellulose materials or mixtures are collected and transported to a manufacturing site and preferably dried by any suitable means to a moisture content of approximately 6% by weight, after which the material is placed in a hammer hog and comminuted into smaller particles of uniform consistency in the usual manner to render the material suitable for particle board manufacture. Following this initial preparation, the comminuted particles are blended with predetermined quantities of an adhesive binder or binders and wax respectively, the latter being used to waterproof the product. A substantial number of thermosetting or thermoplastic binders and waxes suitable for use in particle board production and for use in the present process are well known to the particle board industry and may be used in their usual proportions either alone or in combination with one another. A mixture of thermosetting with a thermoplastic binder is deemed preferable to maximize the adaptability of the product for sawing and sanding by minimizing its tendency to chip. The blending of the comminuted lignocellulose particles with the binder or binders and wax is preferably done with the aid of batch scales and conventional mechanical mixing apparatus.

Figure 2:
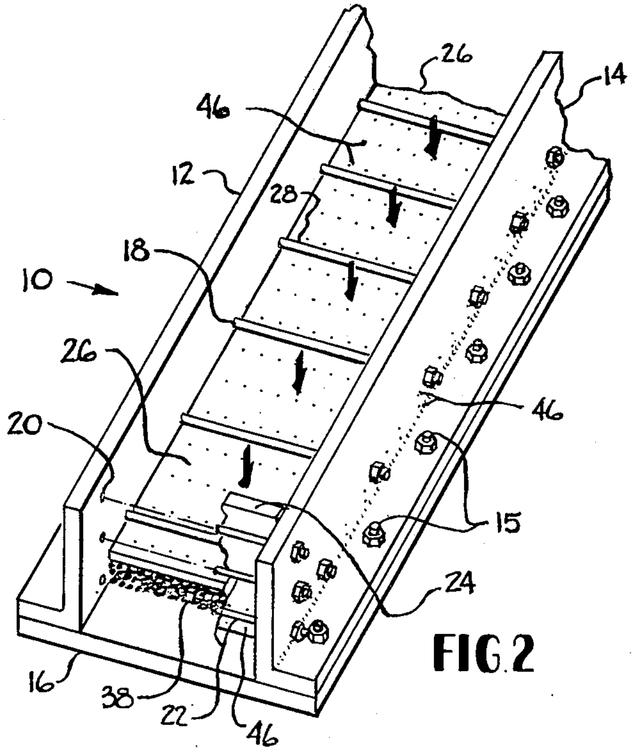
FIG. 2 is a fragmented perspective view of a typical mold which may be utilized in the process of the present invention, with certain portions cut away for clarity.

The next step comprises placing measured quantities of the blended mixture in respective molds of the exemplary type shown in FIG. 2. A typical mold, designated generally as 10, comprises an elongate, channel-shaped member having a pair of flat, parallel upright side walls 12 and 14 connected at the bottom by means of bolts 15 to a base 16 which is joined at right angles with each of the walls 12 and 14. A group of spaced apertures 18 is formed in each of the side walls 12 and 14 respectively, each group running in a straight line above and parallel to the base member with opposite apertures being in transverse alignment with one another. At each end of the mold 10 a vertical row of transversely aligned apertures 20 is also provided in each of the side members 12 and 14. Through these latter apertures 20 a series of transverse bolts 22 are fastened to support respective end plates 24 which seal each end of the channel member. A pressure plate member 26 is provided having a length and width just slightly less than the inside dimensions between the two end plates 24 (only one of which is shown in FIG. 2), and the side walls 12 and 14 respectively. This permits the plate 26 to move freely in a vertical direction between the sides and end plates of the mold, thereby forming a mold enclosure of variable internal height. The interior length of the mold and the interior width between the side members 12 and 14 is dependent entirely upon the dimensions required for the finished product. The interior height of the ultimate mold enclosure, i.e. the interior are bounded by the channel member, the end plates 24 and the underside of the pressure plate 26, should be at least equal to or greater than the minimum thickness required for the finished product. The actual predetermined product thickness is regulated by the ultimate vertical position of the pressure plate 26, which is in turn determined by the location of the two rows of apertures 18. Accordingly, with the thickness of the plate 26 taken into account, the two rows of apertures 18 are spaced a sufficient distance above the upper surface of the base 16 that, when fastener bolts 28 are inserted transversely through the aligned apertures 18 and the pressure plate 26 is installed as shown in FIG. 2 with its upper surface abutting the underside of the bolts 28, the interior space between the plate 26 and the base member will be equal to the particular predetermined thickness desired for the pressed product.

It will be understood that fastening means other than bolts such as 28 might be utilized to lock the plate 26 into position, such as for example spring-loaded cams or lugs which automatically snap over the plate when the plate has been depressed sufficiently into the mold.

Figure 3:
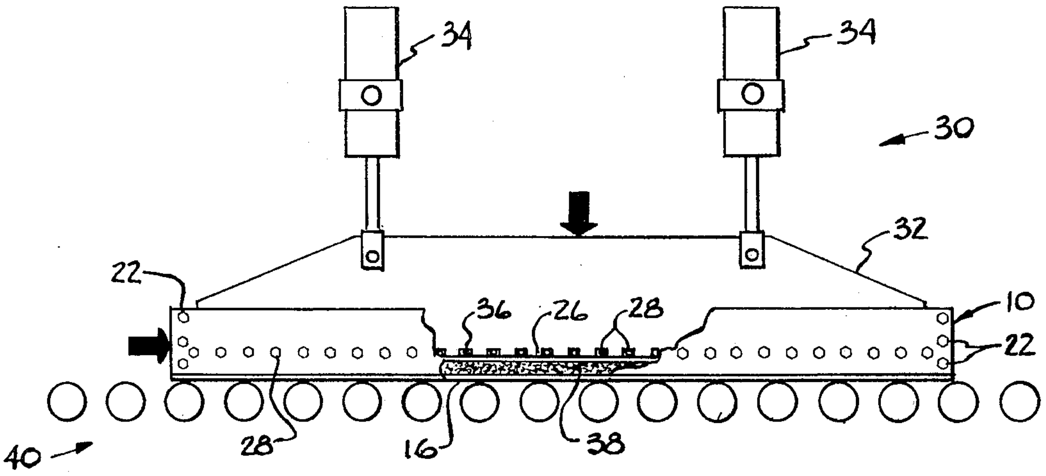
FIG. 3 is a simplified, partially schematic side view illustrating the initial compression of the particle board material in a press, with portions of the mold cut away for clarity.

In the process of the present invention, the foregoing blended mixture of lignocellulose particles, binder and wax is weighed to a specific measured quantity preparatory to being placed in a respective mold 10 of the type just described. The height of the uncompressed mixture initially placed in the mold will of course be much greater than the final compressed thickness. Such uncompressed mixture should be spread evenly throughout the mold, its quantity being such that a predetermined pressure on the plate 26 is required to compress the mixture to the final predetermined thickness. The predetermined pressure is variable, again depending upon such factors as strength and density requirements for the finished product dictated by the particular intended application. As soon as the mold 10 has been filled with the measured weight of mixture, the pressure plate 26 is inserted into the mold atop the mixture and the mold is conveyed to a press. The press, indicated generally as 30 in FIG. 3, comprises an elongate, cylinder-actuated plunger 32 sized so as to fit loosely between the side and end walls of the mold 10 and designed to distribute a predetermined initial external pressure evenly along the top of the pressure plate 26. The bottom face of the plunger 32 includes a group of transverse notches 36 spaced so as to correspond with the spacing of the apertures 18 in the side walls of the mold 10.

Upon placement of the mold in proper position beneath the press 30, with the apertures 18 vertically aligned with the notches 36, pressure is applied to the plunger 32 which thereby forceably pushes the pressure plate 26 into the mold 10 and compresses the mixture 38. While the external pressure is being applied, the fastener bolts 28 are inserted through the respective apertures 18 over the plate 26, the insertion being made possible by the aligned notches 36. After insertion the bolts are tightened so as to prevent any spreading of the side walls 12 and 14 of the mold which might otherwise occur due to the internal pressure within the compressed material 38. The press 30 is then released, but the internal pressure existing within the mixture 38 is nevertheless maintained by the plate 26, now retained in its compressed position by the fastener bolts 28 as shown in FIG. 2. While the mold is in this condition it is removed from the press 30, preferably by transferring it forward on a conveyor such as 40. This frees the press 30 immediately to accept another mold of the same type, thereby permitting the compression and fastening steps just described to be repeated continuously.

As will be apparent to those skilled in the art, the press 30 may alternatively be of the inverted type wherein the cylinders are positioned beneath the mold and pressure is exerted upwardly against the surface upon which the mold rests. Other structural features of the press may also be variable, depending upon the specific structure of the mold and the type of fastening means employed.

Figure 4:
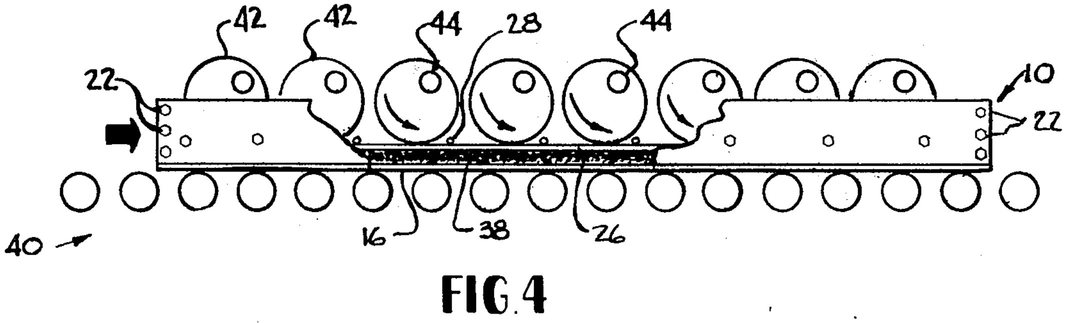
FIG. 4 is a simplified, partially schematic side view illustrating an alternative method of compressing the material.

A somewhat different type of press, also capable of accomplishing the foregoing compression step, is shown in FIG. 4. The mold 10 and compression process are the same as before, but in this case the press comprises a series of eccentrically mounted rollers 42, each fixed to a respective shaft 44. Initially the rollers 42 are situated with their eccentric portions facing upwardly to permit the mold 10 to be placed beneath the rollers. Thereafter the rollers 42, which are narrow enough to fit between the side walls 12 and 14 of the mold, are forceably rotated in a counter-clockwise direction as shown in FIG. 4 by torque applied to the respective shafts 44, thereby pushing the plate 26 down and compressing the material 38 as before. The fastener bolts 28 may then be inserted in the spaces between the rollers to retain the pressure plate 26. Other molding techniques employing the foregoing basic principles of initial compression and subsequent pressure retention may also be utilized and may be equally satisfactory.

After their removal from the press 30 the molds 10, with their pressure plates 26 still fastened in compressed position, are transferred to a curing oven. The oven is preferably of elongate configuration with multiple tiers of conveyors moving from an entry port to an exit port of the oven. The speed of the conveyors through the oven is regulated so as to insure a minimum heating period sufficient to properly cure and thereby harden any thermosetting binder used or plasticize any thermoplastic binder used, or do both if a combination of such binders is used, throughout the entire thickness of the material at the particular oven temperature utilized so as to effect ultimate bonding of the mixture throughout. Preferably the combination of oven temperature and time are sufficient to cause any substantial scorching or charring of the mixture. It will be readily understood by those skilled in the art that the maximum temperature and the time of heating may vary depending upon the particular lignocellulose materials utilized and their susceptibility to scorching, the type of binder of binders utlized, and especially the thickness of the mixture.

Upon their exit from the oven the molds are permitted to cool sufficiently to insure that hardening of any thermoplastic binder utilized is complete, the extent of such cooling also being a function of the type of binders utilized and the thickness of the mixture. Thereafter the molds may be dismantled by first loosening the bolts 15 on one side of the mold to relieve the pressure on the fastener bolts 28 and then loosening and extracting the bolts 28. Thereafter the bonded particle board product is removed from the mold and either used as is or, alternatively, sanded and/or cut as desired. Removal of the pressed product from the mold may be facilitated by spraying, smearing or otherwise depositing a suitable releasing agent such as oil or grease on the interior surfaces of the mold prior to filling it with the mixture, to prevent the product from adhering to the interior of the mold. The molds, pressure plates and fastener bolts respectively are returned to stations where they may be reused in the process.

It should be noted that the side walls and end walls 12, 14 and 24 respectively of the typical mold, as well as the base 16 and the pressure plate 26, are provided with a large number of small vent holes 46 which perform a two-fold purpose. First, during the initial compression of the material the vents 46 readily permit the escape of air in the mixture and thereby aid the compaction of the material. Second, during the heating step, the same vents 46 also permit the escape of water vapor. In addition, the mold 10 is preferably constructed of an aluminum alloy which is a good conductor of heat and thereby further aids both the heating and cooling processes.

The invention will now be described further with reference to the following examples showing how different particle board products may be prepared utilizing the foregoing molding method.

EXAMPLE 1

A mixtue of cedar sawmill waste containing sawdust, shaving and bark in the same proportions found at the sawmill site (including roughly at least 30–35% cedar bark by weight) is dried to a moisture content of approximately 6% , after which the cedar waste mixture is placed in a hammer hog and chopped into smaller particles of uniform consistency suitable for particle board manufacture. The comminuted waste material is blended with a thermosetting phenolic resin binder (e.g. Dry Monsanto Resinox Compound 673 or 736), a thermoplastic binder (e.g. Vinsalyn, manufactured by Hercules, Inc. of Wilmington, Delaware) and a wax (e.g. Hercules brand Paracol 800N). The proportions are such tha the resultant mixture comprises approximately 91.75% cedar waste, 3.75% thermosetting binder, 3.75% thermoplastic binder, and .075% wax by weight. The blended mixture is placed in a mold of the type described, preferably having an interior width of 11½inches and an interior length of 24 feet. The two rows of apertures 18 in the mold are positioned such that, with the pressure plate 26 installed with its upper surface abutting the underside of the bolts 28, the interior space beween the plate 26 and the base member 16 is 1½plus inches. About 135 pounds of the foregoing blended mixture of cedar waste, binders and wax are spread evenly in the mold. In its uncompressed conditon the mixture fills the mold to a height of approximately 8 inches. The pressure plate 26 is then inserted into the mold atop the mixture and the mold is conveyed to the press where an initial external pressure of about 1,200 psi is applied to depress the plate. The fastener bolts 28 are inserted and tightened, and the external pressure imposed on the plate by the press is then released. The mold is removed from the press as an assembly and transferred to an oven where it is baked for about two hours at a maximum oven temperature of approximately 450° F. to avoid scorching, 425° F. being preferable, after which the mold is removed from the oven and permitted to cool in ambient air until the compressed material is below 200° F., which takes about ½ hour. Thereafter the mold is dismantled and the product removed. The product is cut and sanded so as to produce 8 foot length of nominal two-by-fours, two-by-sixes or two-by-twelves as desired, the actual thickness of such pieces being 1½ inches in accordance with present dimensional lumber standards.

A board prepared in accordance with the foregoing example is exposed directly to a blow torch flame continuously for approximately 30 seconds without igniting. A board prepared in the same manner but without including any cedar bark is ignited immediately when similarly exposed to the blow torch flame.

EXAMPLE 2

The process is the same as that described in Example 1 except that no thermoplastic binder is used and the thermosetting binder constitutes 7½% by weight of the blended mixture. The resultant product has characteristics comparable to those of the product of Example 1 except that it has a somewhat greater tendency to chip and thus is not as well adapted to be sawed.

EXAMPLE 3

In this example the process is essentially the same as in Example 1 except that no cedar waste is used and instead the lignocellulose materials constitute any one of the following redwood wastes:

a. 100% bark;
b. 90% bark, 10% sawdust;
c. 80% bark, 20% sawdust;
d. 70% bark, 30% sawdust;
e. 60% bark, 40% sawdust;
f. 50% bark, 50% sawdust.

The mixture is molded in pieces of 1⅛ inch thickness in molds 7½ inches wide and 8 feet long, about 28 lbs. of mixture being required per mold. Upon removal from the mold, the product is sawed into eight-foot pieces of bevel siding having a thickness from ¼ inch on the narrow edge to ¾ inch on the wide edge, the extra ⅛ inch being consumed in sawing and sanding.

EXAMPLE 4

The process and blended mixture are the same as in Example 3 except that the redwood waste is replaced by a mixture of gum tree and oak shavings, chips and bark in the same proportions as such waste is normally found at the sawmill site. Pieces of bevel siding are cut from the resultant molded product.

EXAMPLE 5

The process and blended mixture are essentially the same as in Example 1 except no cedar waste is used and instead the lignocellulose material is comminuted creosoted wood from used railroad ties. The blended mixture is pressed in molds designed to produce pieces of either 9 or 18 foot lengths having a rectangular cross-section of 7 inches thick by 9 inches wide. About 300 lbs. of undried mixture or 230 lbs. of dried mixture are required per 9 foot mold. If the mixture is undried, substantial water as well as air through the vents 46 during the compression step. Oven time, at 425° F. oven temperature, is approximately 4–5 hours. Oven temperature could be increased above the scorching point in this particular application if needed to accelerate heating, assuming that some surface scorching of the railroad ties would probably not be objectionable. Lignocellulose materials from another than used ties could also be used if desired, either alone or in combination with the creosoted wood. Creosote may be added to any of the foregoing mixtures if needed to insure wood preservation, more creosote obviously being needed if fresh lignocellulose materials are used than if recycled ties are used. The resultant ties will be creosoted throughout, as opposed to lumber ties which are creosoted only adjacent their outer surfaces.

EXAMPLE 6

The process is the same as in Example 1 except that an elongate stiffener material such as wire, fiberglass rods or expanded metal is placed into the mold together with the blended mixture prior to compression so as to produce a stiffener molded product.

The examples, terms and expressions which have been employed in the foregoing abstract and specification are used therein for description and are not intended in any way to limit the scope of the invention nor exclude equivalents of the methods and features shown and described or portions thereof, it being recognized that the scope of the invention is defined and limited only by the claims which follow.

What is claimed is:

1. A process for producing a monolithic wood particle board railroad tie capable of supporting normal railroad track loads comprising:

a. mixing comminuted particles of wood impregnated with creosote with a curable thermosetting adhesive binder into a uniform mixture;
b. placing a measured amount of said mixture into the cavity of an enclosing mold having a movable pressure member forming part of said enclosing mold;
c. applying by a press an external force to move said pressure member to a position to compress said mixture in said mold to a density which is at least about five times the uncompressed density of said mixture and to width, thickness and length dimensions at least as great as the width, thickness and length of a wood railroad tie;
d. locking said pressure member in said mold to said pressed position as an assembly, and relieving said pressure member of said external force applied by said press while retaining said pressure member locked in said pressed position;

e. removing said mold and locked pressure member assembly from said press;
f. thereafter heating said mixture in said mold while said pressure member remains locked in said pressed position so as to heat and cure said binder and thereby bond said mixture into said particle board; and
g. removing said bonded particle board from said mold.

2. The process of claim 1 wherein said step (c) comprises compressing said mixture in said mold to an elongate shape of rectangular cross-section having thickness and width dimensions corresponding to the thickness and width of a wood railroad tie.

3. The process of claim 1 including the step of placing a stiffener material in said mold with said mixture prior to compressing it so as to reinforce said particle board.

4. A method of reconstituting used wood railroad ties, having rotted portions rendering such ties too weak to support normal railroad track loads, into new wood particle board railroad ties capable of supporting said normal track loads comprising:
a. mixing comminuted used wood railroad ties, including said rotted portions of said used ties, with a curable thermosetting adhesive binder and cresote into a uniform mixture;
b. placing a measured amount of said mixture into the cavity of an enclosing mold having a movable pressure member forming part of said enclosing mold;
c. applying by a press an external force to move said pressure member to a position within said mold to compress said mixture to a density which is at least about five times the uncompressed density of said mixture and to width, thickness and length dimensions at least as great as the width, thickness and length of a wood railroad tie;
d. locking said pressure member in said mold to said pressed position as an assembly, and relieving said pressure member of said external force applied by said press while retaining said pressure member locked in said pressed position;
e. removing said mold and locked pressure member assembly from said press;
f. heating said mixture in said mold while said pressure member remains locked in said pressed position so as to heat and cure said binder and thereby bond said mixture into said particle board; and
g. removing said bonded particle board from said mold.

5. The process of claim 4 wherein said step (c) comprises compressing said mixture in said mold to an elongate shape of rectangular cross-section having thickness an width dimensions corresponding to the thickness and width of a wood railroad tie.

6. The process of claim 4 including the step of placing a stiffener material in said mold with said mixture prior to compressing it so as to reinforce said particle board.

7. A process for producing a monolithic wood particle board railroad tie capable of supporting normal railroad track loads comprising:
a. mixing comminuted particles of wood impregnated with creosote with a thermoplastic adhesive binder into a uniform mixture;
b. placing a measured amount of said mixture into the cavity of an enclosing mold having a movable pressure member forming part of said enclosing mold;
c. applying by a press an external force to move said pressure member to a position to compress said mixture in said mold to a density which is at least about five times the uncompressed density of said mixture and to width, thickness and length dimensions at least as great as the width, thickness and length of a wood railroad tie;
d. locking said pressure member in said mold to said pressed position as an assembly, and relieving said pressure member of said external force applied by said press while retaining said pressure member locked in said pressed position;
e. removing said mold and locked pressure member assembly from said press;
f. heating said mixture in said mold to plasticize said thermoplastic binder;
g. cooling said mixture in said mold to set said binder while said pressure member remains locked in said pressed position so as to bond said mixture into said particle board; and
h. removing said bonded particle board from said mold.

8. The process of claim 7 wherein said step (c) comprises compressing said mixture in said mold to an elongate shape of rectangular cross-section having thickness and width dimensions corresponding to the thickness and width of a wood railroad tie.

9. The process of claim 7 including the step of placing a stiffener material in said mold with said mixture prior to compressing it so as to reinforce said particle board.

10. A method of reconstituting used wood railroad ties, having rotted portions rendering such ties too weak to support normal railroad track loads, into new wood particle board railroad ties capable of supporting said normal track loads comprising:
a. mixing comminuted used wood railroad ties, including said rotted portions of said used ties, with a thermoplastic adhesive binder and cresote into a uniform mixture;
b. placing a measured amount of said mixture into the cavity of an enclosing mold having a movable pressure member forming part of said enclosing mold;
c. applying by a press an external force to move said pressure member to a position within said mold to compress said mixture to a density which is at least about five times the uncompressed density of said mixture and to width, thickness and length dimensions at least as great as the width, thickness and length of a wood railroad tie;
d. locking said pressure member in said mold to said pressed portion as an assembly, and relieving said pressure member of said external force applied by said press while retaining said pressure member locked in said pressed position;
e. removing said mold and locked pressure member assembly from said press;
f. heating said mixture in said mold to plasticize said thermoplastic binder;
g. cooling said mixture in said mold to set said binder while said pressure member remains locked in said pressed position so as to bond said mixture into said particle board; and
h. removing said bonded particle board from said mold.

11. The process of claim 10 wherein said step (c) comprises compressing said mixture in said mold to an elongate shape of rectangular cross-section having thickness and width dimensions corresponding to the thickness and width of a wood railroad tie.

12. The process of claim 10 including the step of placing a stiffener material in said mold with said mixture prior to compressing it so as to reinforce said particle board.

13. The process of claim 1 wherein said enclosing mold is of elongate shape having a pair of elongate longitudinal side walls spaced from one another in opposed relationship connected together by a base, further including the step, concurrently with said steps (d), (e) and (f), of restraining said opposing side walls at locations above said base and intermediate the ends of said mold from spreading apart.

14. The process of claim 7 wherein said enclosing mold is of elongate shape having a pair of elongate longitudinal side walls spaced from one another in opposed relationship connected together by a base, further including the step, concurrently with said steps (d), (e), (f) and (g), of restraining said opposing side walls at locations above said base and intermediate the ends of said mold from spreading apart.

* * * * *

UNITED STATES PATENT AND TRADEMARK OFFICE
CERTIFICATE OF CORRECTION

PATENT NO. : 3,995,003

DATED : November 30, 1976

INVENTOR(S) : Edward Potter, Irving W. Potter, and Robert M. Smyth

It is certified that error appears in the above-identified patent and that said Letters Patent are hereby corrected as shown below:

| | | |
|---|---|---|
| Col. 1 | Line 7 | After "1972" insert a comma (,); |
| | Line 52 | Change "goss" to --Goss--; |
| | Line 67 | Change "may" to --might--. |
| Col. 2 | Line 3 | After "at" add the word --a--; |
| | Line 8 | Change "178" to --1/2--; |
| | Line 13 | Change "178" to --1/2--. |
| Col. 3 | Line 4 | After the word "press" delete "while retaining its advantages"; |
| | Line 7 | Change "tupe" to --type--. |
| Col. 4 | Line 10 | Change "palten" to --platen--; |
| | Line 19 | After "No. 3,804,935" insert a comma (,); |
| | Lines 24, 25 | Change "additonally" to --additionally--. |
| Col. 6 | Line 26 | Change "are" to --area--. |

UNITED STATES PATENT OFFICE

CERTIFICATE OF CORRECTION

Patent No. 3,995,003 Dated November 30, 1976

Inventor(s) Edward Potter et al.

It is certified that error appears in the above-identified patent and that said Letters Patent are hereby corrected as shown below:

| | | |
|---|---|---|
| Col. 8 | Line 4 | Change "sufficient" to --insufficient--; |
| | Line 10 | Change the second occurrence of the word "of" to --or--; |
| | Line 10 | Change "utlized" to --utilized--; |
| | Line 50 | Change "mixtue" to --mixture--; |
| | Line 51 | Change "shaving" to --shavings--; |
| | Line 63 | Change "tha" to --that--. |
| Col. 9 | Line 24 | Change "length" to --lengths--. |
| Col. 10 | Line 14 | After the word "air" add the word --escapes--; |
| | Line 22 | Change "another" to --other--; |
| | Line 37 | Change "stiffener" to --stiffer--. |
| Col. 11 | Line 55 | Change "an" to --and--. |

UNITED STATES PATENT OFFICE

CERTIFICATE OF CORRECTION

Patent No. 3,995,003 Dated November 30, 1976

Inventor(s) Edward Potter et al.

It is certified that error appears in the above-identified patent and that said Letters Patent are hereby corrected as shown below:

| | | |
|---|---|---|
| Col. 12 | Line 55 | Change "portion" to --position--. |
| Col. 14 | Line 6 | Change "wherin" to --wherein--. |

Signed and Sealed this

Seventh Day of June 1977

[SEAL]

*Attest:*

RUTH C. MASON
*Attesting Officer*

C. MARSHALL DANN
*Commissioner of Patents and Trademarks*